United States Patent
McClenahan

(10) Patent No.: US 9,621,632 B2
(45) Date of Patent: Apr. 11, 2017

(54) SCALING OF STATEFUL ENTERPRISE SERVICES

(75) Inventor: Weili McClenahan, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 953 days.

(21) Appl. No.: 13/033,948

(22) Filed: Feb. 24, 2011

(65) Prior Publication Data

US 2014/0040502 A1 Feb. 6, 2014

(51) Int. Cl.
*G06F 15/173* (2006.01)
*H04L 29/08* (2006.01)

(52) U.S. Cl.
CPC .................................. *H04L 67/10* (2013.01)

(58) Field of Classification Search
USPC ........................................................ 709/238
See application file for complete search history.

(56) References Cited

U.S. PATENT DOCUMENTS

| | | | |
|---|---|---|---|
| 2005/0050202 A1* | 3/2005 | Aiken et al. ................ | 709/227 |
| 2005/0135388 A1* | 6/2005 | Hartikainen et al. ........ | 370/401 |
| 2005/0144482 A1* | 6/2005 | Anuszewski ................ | 713/201 |
| 2006/0085549 A1* | 4/2006 | Hasti et al. ................ | 709/227 |
| 2008/0040717 A1* | 2/2008 | Hobson ...................... | 718/101 |
| 2008/0052755 A1* | 2/2008 | Pham et al. ................... | 726/1 |
| 2008/0313721 A1* | 12/2008 | Corella ........................ | 726/6 |
| 2009/0006539 A1* | 1/2009 | Degenkolb et al. ......... | 709/203 |
| 2009/0133100 A1* | 5/2009 | Buchwald et al. ............ | 726/3 |
| 2012/0158865 A1* | 6/2012 | Kurian et al. ............... | 709/206 |

OTHER PUBLICATIONS

R.Fielding et al, "Hypertext Transfer Protocol—HTTP 1.1", Jun. 1999, Network Working Group, all pgs.*

* cited by examiner

*Primary Examiner* — Ryan Jakovac
(74) *Attorney, Agent, or Firm* — Shook, Hardy & Bacon L.L.P.

(57) ABSTRACT

In one embodiment, a method of scaling stateful enterprise services is provided. In this method, a request for data from an enterprise application is received. A user identifier is identified from the request, and an instance of the enterprise application that is associated with the user identifier is identified. The request is then routed to the identified instance of the enterprise application.

19 Claims, 8 Drawing Sheets

SCALING OF STATEFUL ENTERPRISE SERVICES

FIELD

The present disclosure relates generally to enterprise systems. In one example embodiment, the disclosure relates to the scaling of stateful enterprise services.

BACKGROUND

Traditional enterprise services rely on stateful enterprise applications that are designed to serve a limited number of users in a single tenant environment. Generally, a "stateful" application refers to an application that is designed to track sessions. The use of stateful enterprise applications to provide enterprise services is inefficient for large-scale systems because each time a request for a business object is made, a network hit is required to retrieve the business object from a particular instance of an enterprise application that is configured to serve the request. The enterprise application that handles the request can be easily overloaded. Currently, each instance or session can handle about 10,000 users, but in a cloud environment, millions of users are served.

One solution to scale stateful enterprise services to serve a large number of users is to replicate copies of a single instance of an enterprise application such that the copies of the instance can also handle the requests. However, such session replication is time-consuming, and after replication, all the copies of the instances need to be synchronized periodically, which can cause delays in the retrieval of data. Another solution is to redesign each stateful enterprise application to be stateless, but the redesign and implementation of a stateless enterprise system can be time-consuming, labor-intensive, and generally just not practical when a large number of stateless enterprise applications have been deployed.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Embodiments described herein provide techniques for scaling stateful enterprise services. In particular, a gateway is added to an enterprise platform. Generally, the gateway is configured to route messages to the appropriate instance of an enterprise application. As explained in detail below, the gateway can route the messages based on user identifiers included within the messages.

Figure 1:
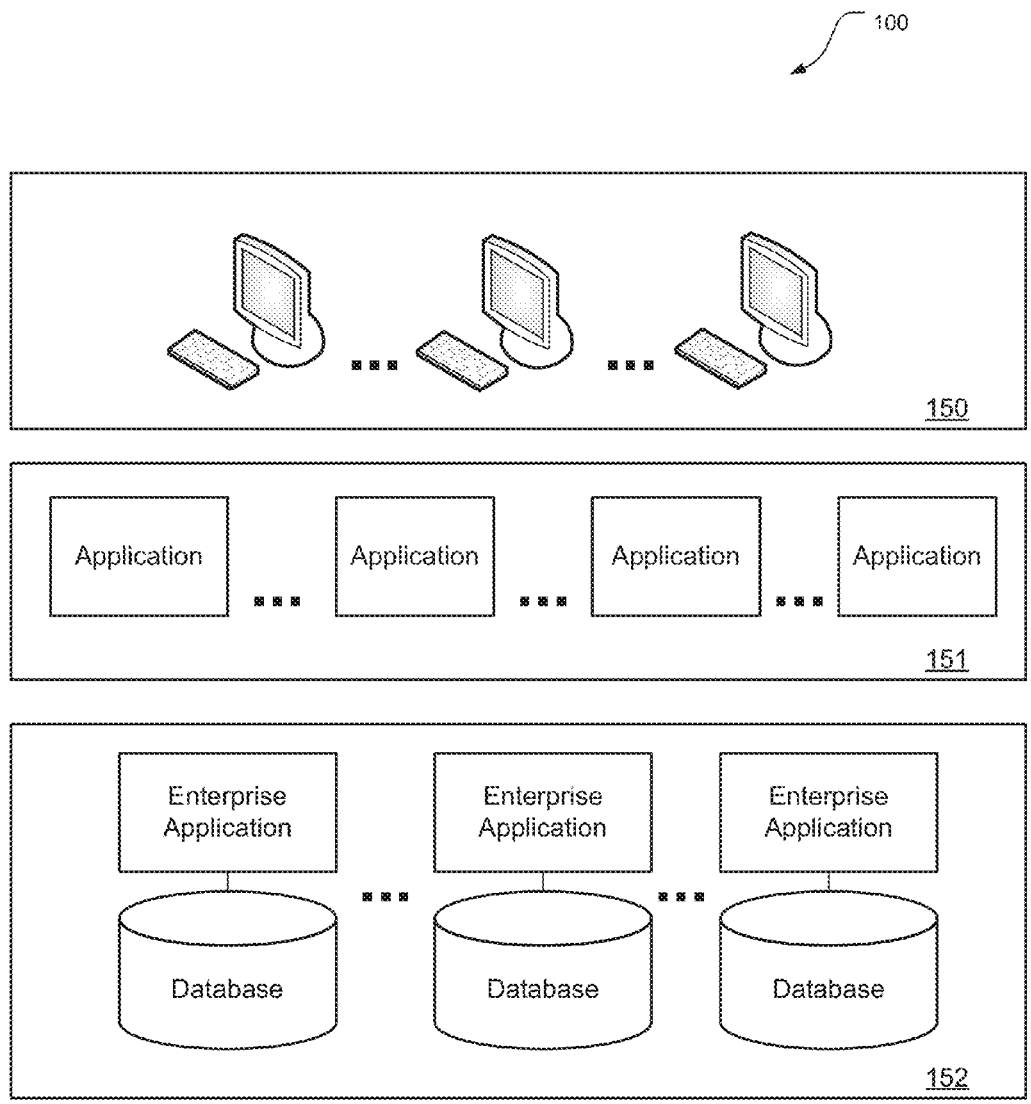
FIG. 1 is a block architectural diagram depicting an enterprise system embodied in a cloud-computing environment.

FIG. 1 is a block architectural diagram depicting an enterprise system embodied in a cloud-computing environment. Generally, cloud computing is a model for enabling on-demand network access to a shared pool of configurable computing resources (e.g., networks, servers, storage, applications, and services) that can be provisioned and released with minimal management effort or service provider interaction. An example of such a cloud-based system 100 is depicted in FIG. 1. The cloud-based system 100 includes client platforms 150, applications 151, and enterprise services 152. Here, the various applications 151 running on the cloud infrastructure are accessible from various client platforms 150 (e.g., desktop computers, mobile phones, laptops, tablet computers, and personal digital assistants) through thin client interfaces, such as a Web browser. Examples of applications 151 include social networking websites, video sharing websites, hosted services, web applications, and other applications.

Each of these applications 151 relies on one or more enterprise services 152, which refer to the underlying structure supporting communications among units of work (also referred to as services) executed on behalf of the applications 151. An example of enterprise services 152 is ADOBE LIVECYCLE Enterprise Suite, which a Service-oriented architecture Java-based server software product used to build enterprise applications that automate a broad range of business processes. Such enterprise applications can, for example, provide data capture (e.g., create and deploy Extensible Markup Language (XML) based form templates such as ADOBE PDF or HyperText Markup Language (HTML) for use with the ADOBE READER, ADOBE FLASH Player, and web browsers), information assurance (e.g., digital signatures and rights management), document output (e.g., ADOBE PDF Generator, form generators, and output production prints), content services, and process management to deliver business processes such as account opening, services and benefits enrollment, correspondence management, requests for proposal processes, and other business-related workflows.

In the cloud-based system 100, the services provided by the enterprise applications are pooled to serve multiple applications 151 and client platforms 150 using a multi-tenant model, as explained in detail below, with different physical and virtual resources dynamically assigned and reassigned according to user demand. As a result, the enterprise services 152 can be scaled according to user demand where enterprise applications can be added or removed. In scaling the enterprise services 152 in the cloud-based system 100, it should be appreciated that a user accessing the applications 151 does not manage or control the underlying cloud infrastructure including network, servers, operating systems, storage, or even individual application capabilities, with the possible exception of limited user-specific application configuration settings.

Figure 2:
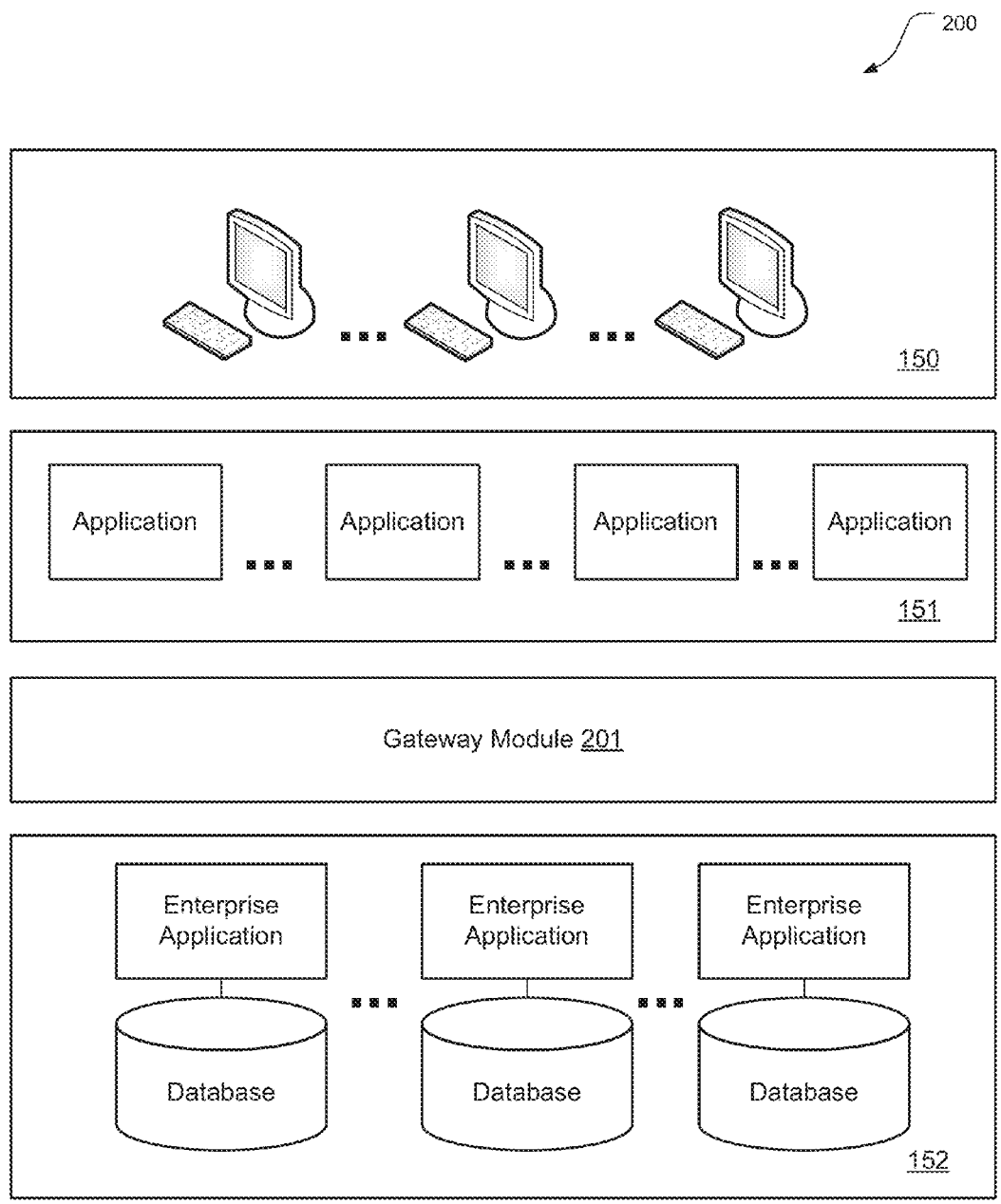
FIG. 2 is a block architectural diagram depicting an enterprise system embodied in a cloud-computing environment with a gateway module, in accordance with an example embodiment.

FIG. 2 is a block architectural diagram depicting an enterprise system embodied in a cloud-computing environment with a gateway module 201, in accordance with an example embodiment. This embodiment of the cloud-based system 200 includes client platforms 150, applications 151, a gateway module 201, and enterprise services 152. In this example, the enterprise services 152 are stateful applications. As used herein, a "stateful" application refers to an application that performs session tracking. In other words, a stateful application is configured to keep track of the state of interaction. For example, a state of an interaction can be tracked by setting values in a storage field designated for tracking purposes. In another example, a particular application that is designed to track a bank balance of a user is a stateful application because this application maintains a record of a user's bank balance and decrements or increases that balance each time the application is called. In contrast, a stateless application does not keep a record of previous interactions, and the stateless application handles each interaction request based entirely on information that comes with the request. For example, Hypertext Transfer Protocol (HTTP) is stateless where each request for a Web page or Uniform Resource Identifier (URI) results in the requested Web page being served, but without the Web server remembering or storing the request. Each communication is discrete and is unrelated to those other communication that precede or follow.

To scale the stateful enterprise services 152, the gateway module 201 can be added to the cloud-based system 200, in accordance with an example embodiment. The gateway module 201 is located between the applications 151 and enterprise services 152 and functions as a link between applications 151 and enterprise services 152. In particular, the gateway module 201 functions as a portal between applications 151 and enterprise services 152 by allowing them to share information (e.g., messages) by way of socket connections or communication between protocols. As an example, the gateway module 201 can be a network point that functions as an entrance to another network (e.g., network connecting enterprise services 152).

The gateway module 201 routes messages (e.g., requests for data) from the applications 151 to one or more enterprise applications used by the enterprise services 152. As explained in more detail below, the gateway module 201 can route the messages based on the user identifier and other information. By enabling dynamic routing of messages in the cloud-based system 200, the enterprise services 152 can be easily scaled because, for example, messages can be redirected to newly added enterprise applications to handle additional workload without the need for session replication.

Figure 3:
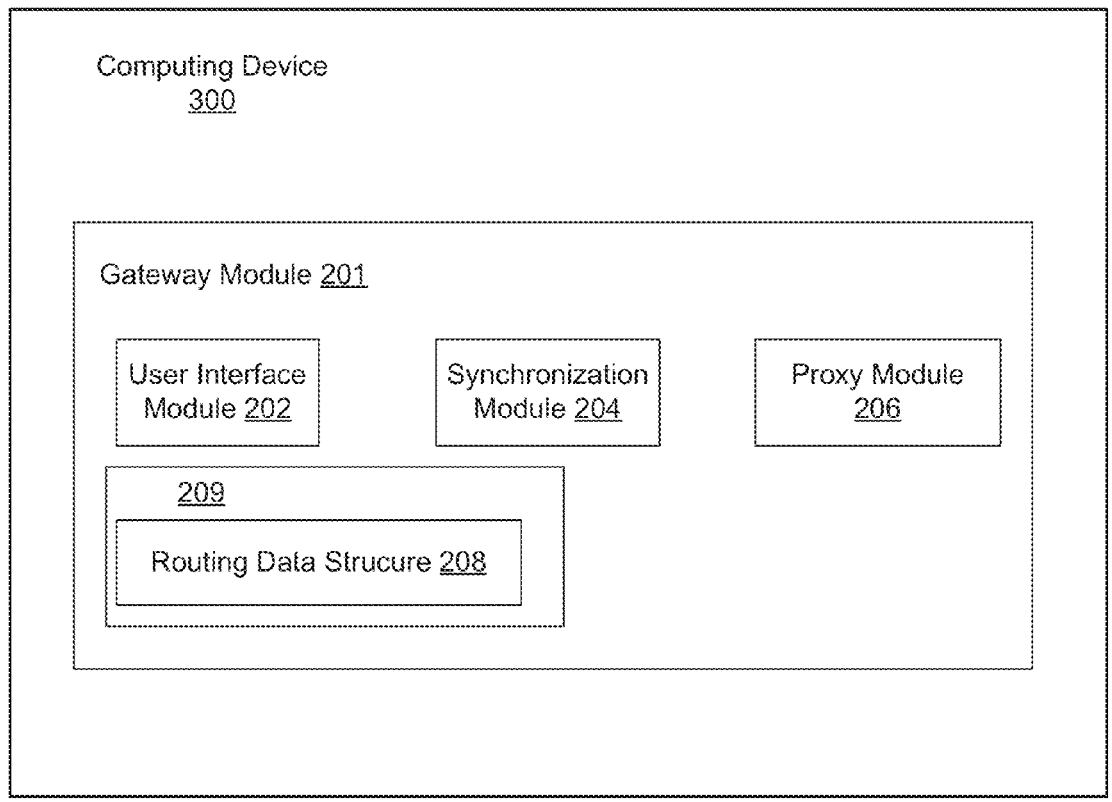
FIG. 3 depicts a block diagram of a gateway module (e.g., the gateway module depicted in FIG. 2), in accordance with an example embodiment, as embodied in a computing device.

FIG. 3 depicts a block diagram of a gateway module 201, in accordance with an example embodiment, as embodied in a computing device 300. It should be appreciated that the computing device 300 may be deployed in the form of, for example, a gateway device, a personal computer, a laptop computer, a server computer, or other computing devices. This computing device 300 may be included in a cloud-based system, such as the cloud-based system 200 depicted in FIG. 2. In one embodiment, the computing device 300 may be the same device that hosts one or more enterprise applications. In an alternative embodiment, the computing device 300 may be a standalone device. In various embodiments, the computing device 300 may be used to implement computer programs, logic, applications, methods, processes, or software to scale enterprise services, as described in more detail below.

As depicted in FIG. 3, the computing device 300 includes a gateway module 201, and in one embodiment, this gateway module 201 is comprised of a user interface module 202, a synchronization module 204, a proxy module 206, and a repository 209 that stores a routing data structure 208. The user interface module 202 is configured to provide one or more graphical user interfaces from which a user can input different information that may be requested by various applications. Examples of such information include user identifiers and user profiles, as well as other information. A "user identifier," as used herein, refers to a value (numeric and/or textual) that uniquely identifies a user. A user profile refers to a collection of personal data associated with a specific user. Examples of user profiles include home address, social security number, home phone number, date of birth, and other user profile information.

The synchronization module 204 is configured to construct and/or maintain the routing data structure 208. Generally, the routing data structure 208 provides context for the organization of routing information. In other words, the routing data structure 208 stores routing information. Examples of routing data structure 208 include tables, arrays, linked lists, databases, and other data structures. As explained in detail below, the synchronization module 204 uses information received from the user interface module 202 to construct the routing information. In addition, as also explained in detail below, the synchronization module 204 is also configured to forward the information received from the user interface module 202 to the appropriate enterprise applications such that they can use the information to perform session tracking.

At runtime, the proxy module 206 is configured to intercept messages from applications and route the messages to the appropriate instances of enterprise applications based on the routing information stored in the routing data structure 208. As explained in more detail below, the proxy module 206 can route the messages based on user identifiers as well as other information that can be extracted from the messages.

It should be appreciated that in other embodiments, the computing device 300 may include fewer or more modules apart from those shown in FIG. 3. For example, in an alternate embodiment, the synchronization module 204 can be integrated within the user interface module 202. The modules 201, 202, 204, and 206 may be in the form of software that is processed by a processor. In another example, as explained in more detail below, the modules 201, 202, 204, and 206 may be in the form of firmware that is processed by application specific integrated circuits (ASIC), which may be integrated into a circuit board. Alternatively, the modules 201, 202, 204, and 206 may be in the form of one or more logic blocks included in a programmable logic device (for example, a field programmable gate array). The described modules 201, 202, 204, and 206 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
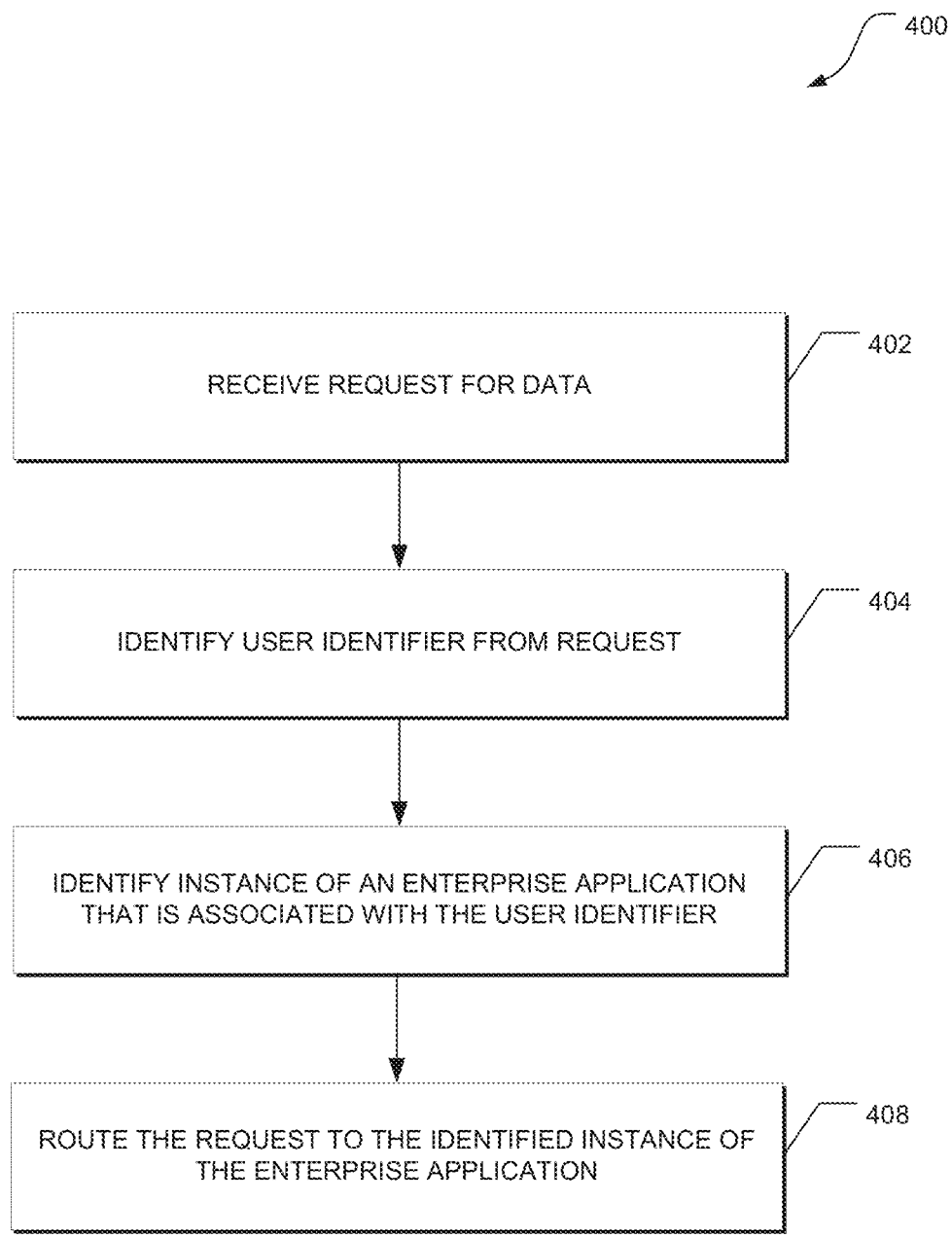
FIG. 4 depicts a flow diagram of a general overview of a method, in accordance with an embodiment, for scaling stateful enterprise services (e.g., as implemented by the gateway modules depicted in FIGS. 2 and 3)

FIG. 4 depicts a flow diagram of a general overview of a method 400, in accordance with an embodiment, for scaling stateful enterprise services. In an example embodiment, the method 400 may be implemented by the proxy module 206 as employed in the computing device 300 of FIG. 3. As depicted in FIG. 4, a proxy module receives a message in the form of a request for data at 402. The proxy module receives this request from an application that relies on services provided by one or more enterprise applications. In particular, this application transmits the request for data from a particular instance of an enterprise application, and the gateway intercepts and receives this request. An example of such a request is a Hypertext Transfer Protocol (HTTP) request.

A user identifier is embedded within this request. The proxy module extracts or identifies the user identifier from the request at 404 and then identifies an instance of a particular enterprise application that is associated with the user identifier at 406. An "instance," as used herein, refers to an occurrence of an enterprise application that is being executed. Multiple instances can be associated with a single enterprise application. That is, a single enterprise application can be initiated with multiple instances. It should be appreciated that a number of different instances of enterprise applications provide services for the applications, and the proxy module can identify one of many instances that is associated with the identified user identifier. In one example, an instance of an enterprise application can be uniquely identified based on the user identifier and service type. With the particular instance identified, the proxy module then routes the request at 408 to the identified instance. As an example, an HTTP request can include an HTTP header: Service: /soap/sdk UserName: adobe_user_1 OperationName: protectDocument. The user identifier "adobe_user_1" and service "/soap/sdk" can be identified from the HTTP header. The instance of the enterprise application can be identified based on the user identifier "adobe_user_1" and the service "/soap/sdk."

As briefly discussed above, the routing of messages to the appropriate instance thereby obviates the need to replicate sessions. As a result, the time needed to synchronize the sessions can be eliminated. Furthermore, existing stateful enterprise services can be deployed in a large-scale system, such as a cloud environment, with the addition of a gateway module without need to redesign the enterprise applications that provide the services. Additionally, as explained in more detail below, the addition of the gateway module also provides multi-tenant support for existing single tenant enterprise applications.

Figure 5:
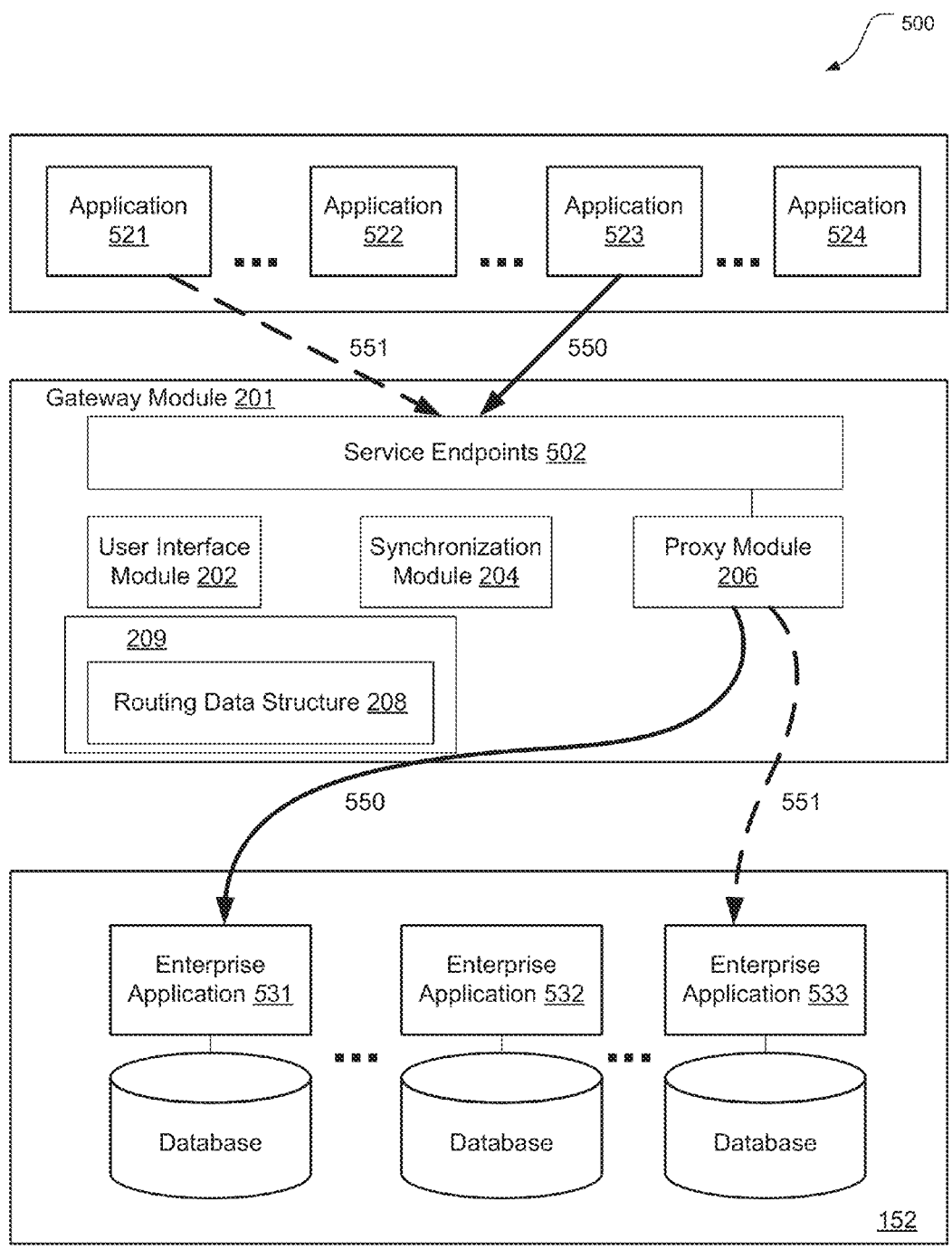
FIG. 5 is a block diagram illustrating a gateway module (e.g., the gateway modules depicted in FIGS. 2 and 3) routing a request in a cloud-based system, in accordance with an example embodiment.

FIG. 5 is a block diagram illustrating a gateway module 201 routing a request in a cloud-based system 500, in accordance with an example embodiment. This example of the cloud-based system 500 includes applications 521-524, a gateway module 201, and enterprise applications 531-533. In this example, the enterprise applications 531-533 are stateful applications, and were not originally designed to be deployed in, for example, a cloud environment where enterprise services can be dynamically scaled to accommodate a large number of users.

The gateway module 201 includes a user interface module 202, a synchronization module 204, a proxy module 206, and a repository 209 that stores a routing data structure 208. In one embodiment, the routing data structure 208 stores associations between a number of user identifiers and a number of instances of enterprise applications. The following Table A is an example of such a routing data structure in the form of a table:

TABLE A

| User Identifier | Instance |
| --- | --- |
| randy@mail.com | ec2-75-101-190-40.compute-1.adobe.com |
| peggy@mail.com | ec2-174-129-173-191.compute-1.adobe.com |
| wendy@mail.com | ec2-00-129-190-121.compute-1.adobe.com |

In Table A, the column "User Identifier" stores the user identifiers in the form of e-mail addresses. The column "Instance" stores the instance identifiers associated with the user identifiers in the corresponding user identifier column. These instance identifiers are in the form of Uniform Resource Locators (URLs) that specify the location or address of an identified instance. From Table A, a proxy module can identify that the instance "ec2-75-101-190-40.compute-1.adobe.com" is associated with user identifier "randy@mail.com." Additionally, the instance "ec2-174-129-173-191.compute-1.adobe.com" is associated with user identifier "peggy@mail.com." The instance "ec2-00-129-190-121.compute-1.adobe.com" is associated with the user identifier "wendy@mail.com."

As an illustrative example, the gateway module 201 receives, from application 523 at runtime, a message 550 in the form of a request for data at service endpoints 502, which provide applications 521-524 with access to the functionalities provided by the gateway module 201. The message 550 has a header that includes information about the user that originated the request. In this example, the header of the request includes the user identifier "randy@mail.com." The proxy module 206 receives the message 550 and identifies the user identifier "randy@mail.com" from the header of the message 550. The proxy module 206 then accesses the routing data structure 208 (e.g., Table A) to identify the particular instance that is associated with the user identifier "randy@mail.com." From Table A, for example, the proxy module 206 identifies from the number of different instances that the URL "ec2-75-101-190-40.compute-1.adobe.com" is associated with the user identifier "randy@mail.com." The URL "ec2-75-101-190-40.compute-1.adobe.com" specifies the location of enterprise application 531 and accordingly, the proxy module 206 routes the message 550 to the instance of the enterprise application 531.

In one embodiment, the proxy module 206 is connected to or in communication with each of the enterprise applications 531-533 by way of a raw socket connection. A "raw socket" is a socket that takes data packets, bypasses the typical Transmission Control Protocol (TCP)/Internet Protocol (IP) processing, and sends them to the appropriate application. In a raw socket connection, there are no translations between protocols and therefore, the delay in the transmission of the message 550 to the instance of the enterprise application 531 is minimal. As a result, the proxy module 206 can quickly route the message 550 to its appropriate instance of enterprise application 531. In routing the message 550, it should be noted that the proxy module 206 does not modify or make any changes to the message 550. Additionally, any messages transmitted from the enterprise applications 531-533 (e.g., in response to the request) to the applications 521-524 are directly transmitted to their respective applications 531-533 without interference from the gateway module 201.

In addition to the user identifier, routing can also be based on the service type. As described previously, examples of different service types include data capture, information assurance, document output, and other services that may be provided by one or more enterprise applications. An example of such a routing data structure can include associations between service type identifiers and instances of enterprise applications. The following Table B is an example of such a routing data structure in the form of a table:

TABLE B

| User Identifier | Service Type Identifier | Instance |
| --- | --- | --- |
| randy@mail.com | ec2 | ec2-75-101-190-50.compute-1.adobe.com |
| peggy@mail.com | ec3 | ec3-174-129-173-191.compute-1.adobe.com |
| wendy@mail.com | ec1 | ec1-00-129-190-121.compute-1.adobe.com |

In Table B, the column "User Identifier" stores the user identifiers in the form of e-mail addresses. The service type identifiers, each of which is a value (numeric and/or textual) that uniquely identifies a type of service, are stored "Service Type Identifier" column. The column "Instance" stores the instance identifiers associated with the corresponding user and service type identifiers. From Table B, a proxy module can identify that the instance "ec2-75-101-190-50.compute-1.adobe.com" is associated with both service type identifier "ec2" and user identifier "randy@mail.com." Additionally, the instance "ec3-174-129-173-191.compute-1.adobe.com" is associated with both service type identifier "ec3" and user identifier "peggy@mail.com." The instance "ec1-00-129-190-121.compute-1.adobe.com" is associated with both service type identifier "ec1" and "wendy@mail.com."

In addition to the service type identifier, the routing can also be based on other information such as a statefulness indicator, which defines whether a particular enterprise application is a stateful or stateless application. For example, in some embodiments, another routing table can be provided that identifies or lists all instances of stateless enterprise applications. Such a routing table can include, for example, columns that identify particular service type identifiers and associated instances.

In an illustrative example and still referring to FIG. 5, the gateway module 201 receives a different message 551, from application 521, in the form of a request for data at service endpoints 502. This message 551 includes a header that includes information about the user that originated the request. Also embedded within the message 551 is a service type identifier, such as "ec3" from the example message 551 "ec3-174-129-100-155.compute-1.adobe.com." The proxy module 206 receives the message 551 and identifies the user identifier "peggy@mail.com" from the header of the message 551 and also the service type identifier "ec3." The proxy module 206 then accesses the routing data structure 208 (e.g., Table B) to identify the particular instance that is associated with the user identifier "peggy@mail.com" and service type identifier "ec3." From Table B, for example, the proxy module 206 identifies from the number of different instances that the URL "ec3-174-129-173-191.compute-1.adobe.com" is associated with the user identifier "peggy@mail.com" and service type identifier "ec3." In this example, the URL "ec3-174-129-173-191.compute-1.adobe.com" specifies the location of enterprise application 533 and accordingly, the proxy module 206 routes the message 551 to the instance of the enterprise application 533.

The addition of the gateway module 201 may also possibly enable multi-tenant support for stateful enterprise applications 531-533 that were originally designed for single tenancy. It should be appreciated that multi-tenancy generally refers to a principle in software architecture where a single instance of the software (e.g., enterprise applications 531-533) runs on a server, serving multiple client organizations (tenants). The gateway module 201 can route messages to the appropriate tenant, thereby enabling support for multi-tenancy. In reference to FIG. 5, the enterprise applications 531-533 can store data from different tenants. Each tenant has its own set of data that remain logically isolated from data that belongs to all other tenants. In one example, a different database can be allocated to store data for each tenant. In another example, data from multiple tenants can be stored in the same database, with each tenant having its own set of tables that are grouped into a schema created specifically for the tenant. For example, multi-tenancy enables segmentation of businesses from each other.

Figure 6:
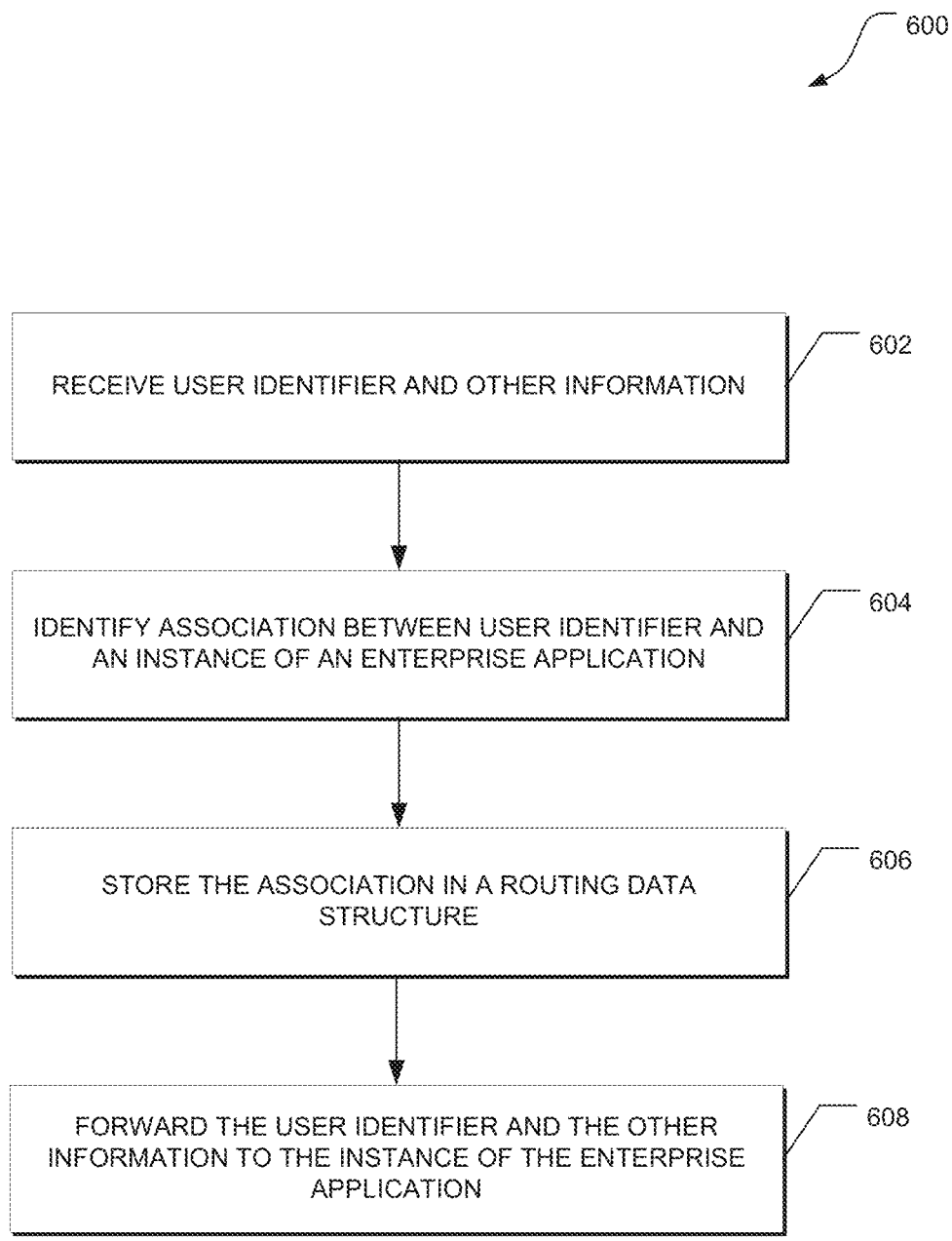
FIG. 6 depicts a flow diagram of a general overview of a method, in accordance with an example embodiment, for constructing and maintaining a routing data structure (e.g., as implemented by the synchronization module depicted in FIG. 3)

FIG. 6 depicts a flow diagram of a general overview of a method 600, in accordance with an example embodiment, for constructing and maintaining a routing data structure. In one example, the method 600 may be implemented by the synchronization module 204 and employed in computing device 300 of FIG. 3. Before the proxy module begins to route messages during runtime, the synchronization module constructs a routing data structure that stores routing information. In the construction of the routing data structure, as depicted in FIG. 6, the synchronization module at 602 receives a user identifier and potentially other information from, for example, the user interface module.

It should be noted that the user interface module provides graphical user interfaces to client platforms such that users may enter various information that may be collected by enterprise applications for session tracking. For example, a user can input his user identifier through the graphical user interface. Other information that can be collected by an enterprise application include the user profile, as described above, and also policy information, which is a set of information related to the settings or preferences of a user that are used by the enterprise applications. Examples of policy information include page settings of a document, a list of one or more default printers, graphical user interface settings, and other policy information.

With the receipt of the user identifier and other information, the synchronization module identifies an association between the user identifier and a particular instance of an enterprise application at 604. In one embodiment, the association between a particular user identifier and an instance of an enterprise application can be based on user-defined rules. For example, a user-defined rule may assign a group of user identifiers to a particular instance of an enterprise application. In another example, a user-defined rule may assign a group of user identifies and a group of service type identifiers to a different instance of an enterprise application.

With the association between the user identifier and an instance of the enterprise application identified, the synchronization module then stores the association in a routing data structure at 606. The synchronization module also forwards the user identifier and other information received from the user interface module to the instance of enterprise application at 608.

Figure 7:
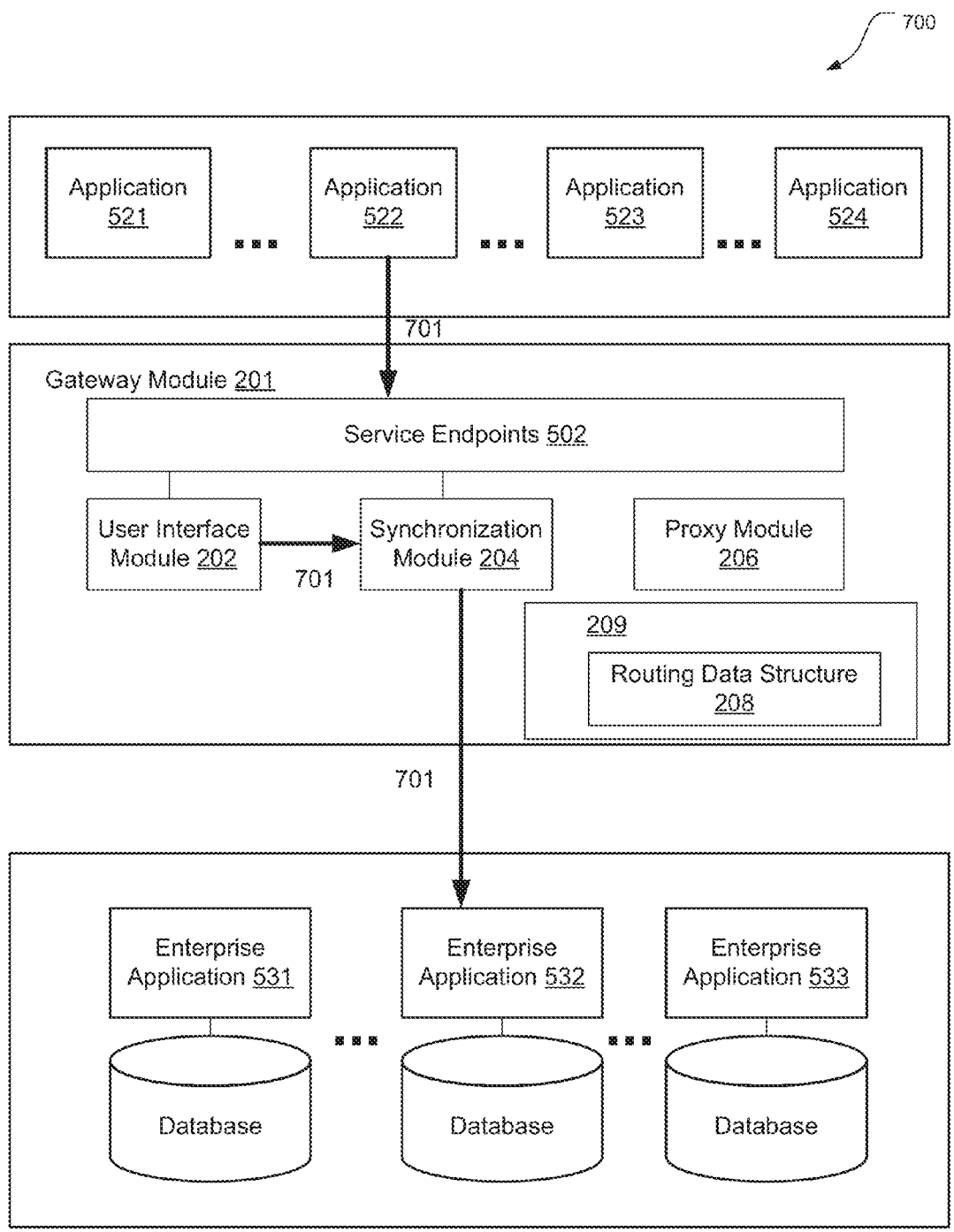
FIG. 7 is a block diagram illustrating a gateway module (e.g., the gateway modules depicted in FIGS. 2 and 3) constructing and maintaining a routing data structure, in accordance with an example embodiment.

FIG. 7 is a block diagram illustrating a gateway module constructing and maintaining a routing data structure, in accordance with an example embodiment. This example of the cloud-based system 700 includes applications 521-524, a gateway module 201, and enterprise applications 531-533. The gateway module 201 includes a user interface module 202, a synchronization module 204, a proxy module 206, and a repository 209 that stores a routing data structure 208.

When a user initially sets up his account to access one or more applications 521-524, various information, such as the user identifier, user profile, and policy information, are collected from the user. In one embodiment, the user interface module 202 provides graphical user interfaces for the input of such information. The user interface module 202 may provide the graphical user interfaces through applications 531-533. Alternatively, the user interface module 202 may provide the graphical user interfaces directly to the client platform, thereby bypassing the applications 531-533. That is, users can directly access the gateway module 201 to input such information.

In the embodiment depicted in FIG. 7, the gateway module 201 receives user identifiers and other information 701 from application 522 at service endpoints 502. The user interface module 202 receives the information 701 and forwards it to the synchronization module 204. The synchronization module 204 identifies an association between the user identifier and a particular instance of an enterprise application and stores the identified association in the routing data structure 208. Additionally, the synchronization module forwards the information 701 to the instance of enterprise application 532. Accordingly, the enterprise application 532 is able to collect the information 701 that is used for session tracking, and at the same time, gateway module 201 can construct or compile routing information for proxy module 206 for the routing of messages at runtime.

Figure 8:
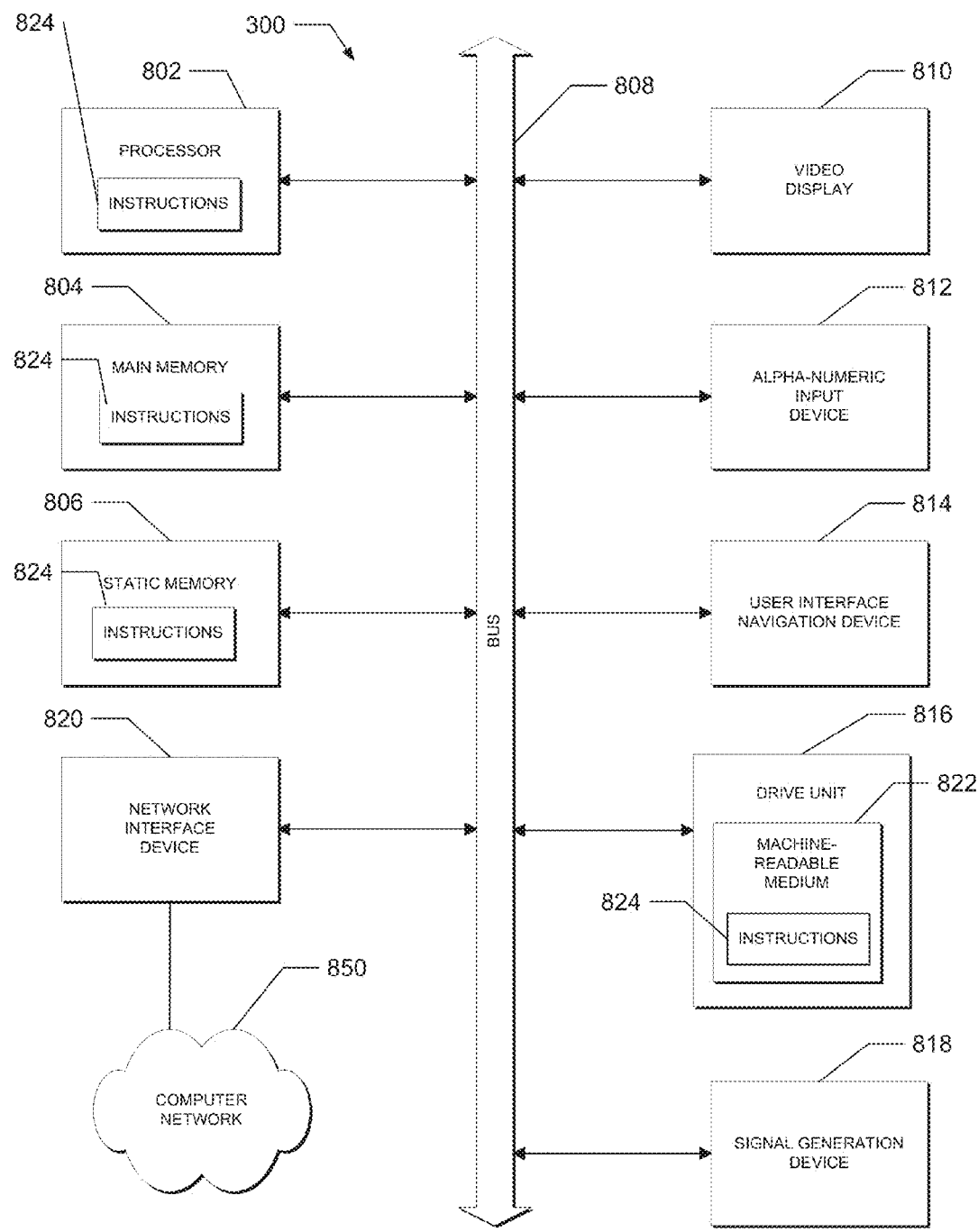
FIG. 8 depicts a block diagram of a machine in the example form of a computing device (e.g., computing device depicted in FIG. 3) within which may be executed a set of instructions for causing the machine to perform any one or more of the methodologies discussed herein.

FIG. 8 depicts a block diagram of a machine in the example form of a computing device 300 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 300 includes a processor 802 (e.g., a central processing unit (CPU), a graphics processing unit (GPU) or both), a main memory 804 (e.g., random access memory), and static memory 806 (e.g., static random-access memory), which communicate with each other via bus 808. The computing device 300 may further include video display unit 810 (e.g., a plasma display, a liquid crystal display (LCD) or a cathode ray tube (CRT)). The computing device 300 also includes an alphanumeric input device 812 (e.g., a keyboard), a user interface (UI) navigation device 814 (e.g., a mouse), a disk drive unit 816, a signal generation device 818 (e.g., a speaker), and a network interface device 820.

The disk drive unit 816 (a type of non-volatile memory storage) includes a machine-readable medium 822 on which is stored one or more sets of data structures and instructions 824 (e.g., software) embodying or utilized by any one or more of the methodologies or functions described herein. The data structures and instructions 824 may also reside, completely or at least partially, within the main memory 804 and/or within the processor 802 during execution thereof by computing device 300, with the main memory 804 and processor 802 also constituting machine-readable, tangible media.

The data structures and instructions 824 may further be transmitted or received over a computer network 850 via network interface device 820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 300) or one or more hardware modules of a computer system (e.g., a processor 802 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an ASIC) to perform certain operations. A hardware module may also comprise programmable logic or circuitry (e.g., as encompassed within a general-purpose processor 802 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 802 configured using software, the general-purpose processor 802 may be configured as respective different hardware modules at different times. Software may accordingly configure a processor 802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 802 or processor-implemented modules. The performance of certain of the operations may be distributed among the one or more processors 802, not only residing within a single machine, but deployed across a number of machines. In some example embodiments, the processors 802 may be located in a single location (e.g., within a home environment, an office environment or as a server farm), while in other embodiments the processors 802 may be distributed across a number of locations.

While the embodiment(s) is (are) described with reference to various implementations and exploitations, it will be understood that these embodiments are illustrative and that the scope of the embodiment(s) is not limited to them. In general, techniques for scaling enterprise services may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of scaling stateful enterprise services, the method comprising:
   receiving a request for data from an enterprise application;
   identifying a received user identifier and a received service type identifier from the request;
   accessing a routing data structure including a plurality of user entries, each user entry being associated with a user and having associated user identifier, a service type identifier, an instance of an enterprise application of a number of instances of enterprise applications, and a statefulness indicator defining whether a corresponding enterprise application is a stateful or stateless application, at least one entry having been created using information collected from a user;
   identifying the instance of the enterprise application in the routing data structure based on the received user identifier, the received service type identifier, and the statefulness indicator; and
   routing the request to the identified instance of the enterprise application.

2. The method of claim 1, wherein the enterprise applications are stateful applications.

3. The method of claim 1, wherein the request is routed to the identified instance by way of a raw socket connection.

4. The method of claim 1, wherein the number of instances of enterprise applications is associated with a multi-tenant architecture.

5. A non-transitory machine-readable medium that stores instructions, which, when performed by a machine, cause the machine to perform operations comprising:
   receiving a request for data from an enterprise application;
   identifying a received user identifier and a received service type identifier from the request;
   accessing a routing data structure including a plurality of user entries, each user entry being associated with a user and having an associated user identifier, a service type identifier, an instance of an enterprise application of a number of instances of enterprise applications, and a statefulness indicator defining whether a corresponding enterprise application is a stateful or stateless application, at least one entry having been created using information collected from a user;
   identifying the instance of the enterprise application in the routing data structure based on the received user identifier, the received service type identifier, and the statefulness indicator; and
   routing the request to the identified instance of the enterprise application.

6. The non-transitory machine-readable medium of claim 5, further comprising:
   receiving the user identifier and other information before receiving the request for the data; identifying an association between the user identifier and the instance of the enterprise application;
   storing the association in the routing data structure; and
   forwarding the user identifier and the other information to the instance of the enterprise application.

7. The non-transitory machine-readable medium of claim 6, wherein the association is identified based on a user-defined rule.

8. The non-transitory machine-readable medium of claim 6, wherein the other information includes policy information.

9. The non-transitory machine-readable medium of claim 6, wherein the other information includes a user profile.

10. The non-transitory machine-readable medium of claim 5, wherein the instances of enterprise applications are all associated in the routing data structure with it multi-tenant architecture.

11. A computing device comprising:
at least one processor; and
a memory in communication with the at least one processor, the memory being configured to store a proxy module that is executable by the at least one processor, the proxy module having instructions that when executed by the at least one processor, cause operations to be performed, the operations comprising:
receiving a request for data from an enterprise application;
identifying a received user identifier and a received service type identifier from the request;
accessing a routing data structure including, a plurality of user entries, each user entry being associated with a user and having an associated user identifier, a service type identifier, an instance of an enterprise application of a number of instances of enterprise applications, and a statefulness indicator defining whether a corresponding enterprise application is a stateful or stateless application, at least one entry having been created using information collected from a user;
identifying the instance of the enterprise application in the routing data structure based on the received user identifier, the received service type identifier, and the statefulness indicator; and
routing the request to the identified instance of the enterprise application.

12. The computing device of claim 11, wherein the memory is further configured to store a user interface module and a synchronization module,
the user interface module having instructions that when executed by the at least one processor, cause operations to be performed, the operations comprising receiving the user identifier and other information before receiving the request for the data,
the synchronization module having instructions that when executed by the at least one processor, cause operations to be performed, the operations comprising identifying an association between the user identifier and the instance of the enterprise application, and storing the association in a routing data structure; and
the proxy module having instructions that when executed by the at least one processor, cause operations to be performed, the operations further comprising forwarding the user identifier and the other information to the instance of the enterprise application.

13. The computing device of claim 11, wherein the enterprise applications are stateful applications.

14. The computing device of claim 11, wherein the request is routed to the identified instance by way of a raw socket connection.

15. The computing device of claim 11, wherein the instance of the enterprise application is identified from a routing data structure that stores associations between a number of user identifiers and a number of instances of enterprise applications.

16. The computing device of claim 11, wherein the number of instances of enterprise applications is associated with a multi-tenant architecture.

17. An enterprise system comprising:
a processor;
a number of enterprise applications; and
a gateway module executing on a processor in communication with the number of enterprise applications, the gateway module having instructions that cause operations to be performed by the processor, the operations comprising:
receiving a request for data from an enterprise application;
identifying a received user identifier and a received service type identifier from the request;
accessing a routing data structure including a plurality of user entries, each user entry being associated with a user and having an associated user identifier, a service type identifier, an instance of an enterprise application of a number of instances of enterprise applications, and a statefulness indicator defining whether a corresponding enterprise application is a stateful or stateless application, at least one entry having been created using information collected from a user;
identifying the instance of the enterprise application in the routing data structure based on the received user identifier, the received service type identifier, and the statefulness indicator; and
routing the request to the identified instance of the enterprise application.

18. The enterprise system of claim 17, wherein the instance of the at least one enterprise application is identified from a routing data structure that stores associations between a number of user identifiers and the number of instances of enterprise applications.

19. A method of scaling stateful enterprise services, the method comprising:
receiving a user identifier and other information;
identifying an association between the user identifier, a service type, an instance of the enterprise application, and a statefulness indicator defining whether a corresponding enterprise application is a stateful or stateless application;
storing the association in a routing data structure that stores associations between a number of user identifiers, a number of service types, a number of instances of enterprise applications, and statefulness indicators;
forwarding the user identifier and the other information to the instance of the enterprise application;
receiving a request for data, the request being for the data from the enterprise application; identifying the user identifier from the request;
identifying the service type from the request;
identifying, from the routing data structure, based on the user identifier, the service type, and the statefulness indicator, the instance of the enterprise application from the number of instances that is associated with the user identifier; and
routing the request to the identified instance of the enterprise application.

* * * * *